Figure 1:
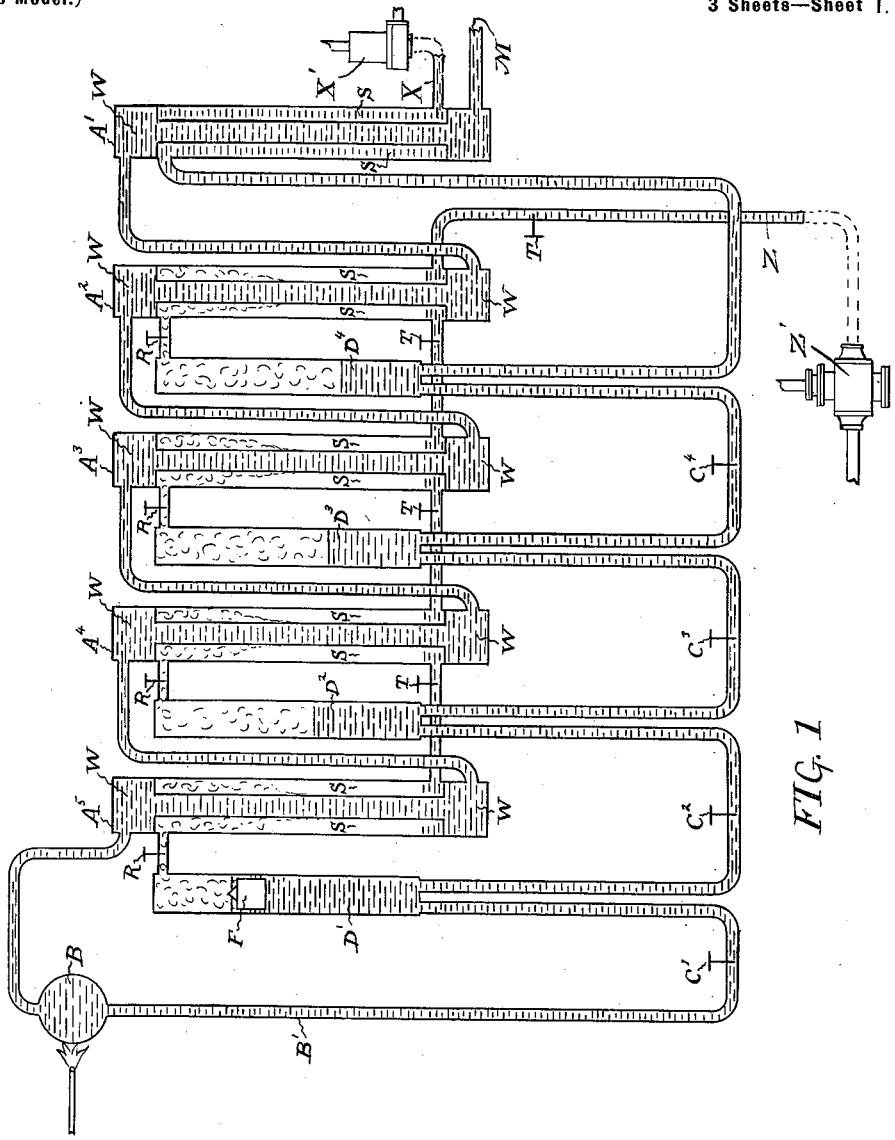

No. 643,702. Patented Feb. 20, 1900.
A. G. WATERHOUSE.
METHOD OF DISTILLING AND EVAPORATING WATER.
(Application filed May 24, 1899.)
(No Model.) 3 Sheets—Sheet 1.

WITNESSES:
John S. Forbes
Kay Lindback

INVENTOR
Addison G. Waterhouse

No. 643,702. Patented Feb. 20, 1900.
A. G. WATERHOUSE.
METHOD OF DISTILLING AND EVAPORATING WATER.
(Application filed May 24, 1899.)
(No Model.) 3 Sheets—Sheet 2.

No. 643,702. Patented Feb. 20, 1900.
A. G. WATERHOUSE.
METHOD OF DISTILLING AND EVAPORATING WATER.
(Application filed May 24, 1899.)
(No Model.) 3 Sheets—Sheet 3.

WITNESSES:
John S. Forbes
Kay Lindback

INVENTOR
Addison G. Waterhouse

UNITED STATES PATENT OFFICE.

ADDISON G. WATERHOUSE, OF PHILADELPHIA, PENNSYLVANIA.

METHOD OF DISTILLING AND EVAPORATING WATER.

SPECIFICATION forming part of Letters Patent No. 643,702, dated February 20, 1900.

Application filed May 24, 1899. Serial No. 718,004. (No specimens.)

*To all whom it may concern:*

Be it known that I, ADDISON G. WATERHOUSE, a citizen of the United States, residing at the city of Philadelphia, in the State of Pennsylvania, have invented a new and useful Method of Distilling and Evaporating Water and other Fluids, of which the following is a specification.

My invention relates to that class of evaporators wherein the heat given off by the condensation of vapors is conducted to the fluids from which vapor or steam is generated; and it consists of a method by which fluid is conducted under pressure to a point where about as much heat is applied to it as the fluid can contain without forming vapor or steam until after the pressure under which the fluid is held is removed; second, in gradually removing the pressure under which the fluid is held, so as to allow part of the heated water to escape in the form of steam; third, in bringing such steam in thermal contact with the fluid under pressure while on its way to the point where additional heat is applied to it, thereby reducing the temperature of the steam or vapor and causing it to condense, and in repeating this operation until the fluid is reduced in temperature, so that it ceases to give off steam, and then transferring the remaining heat of the heated fluid and also the condensed fluid to the cold inflowing fluid under pressure while on its way to the point where additional heat is applied to it.

I know that heretofore distilling or evaporating has been carried on by means which have conserved the heat of the vapors given off by condensation and in which the heat of the condensed fluid has been transferred to the fluid from which the vapor has been drawn; but this has been accomplished by the use of pumps or means for drawing off the steam as it is generated, then compressing it, so that its temperature will be raised above the temperature of the fluid from which the vapor is drawn, and by bringing this compressed vapor in thermal contact with the fluid from which it is drawn the heat is thereby transferred from the compressed vapor back to the fluid from which the vapor is drawn, thereby causing the vapor to condense into fluid and furnish heat to the fluid, which aids in the work of converting the same into vapor. The objection to this method is that owing to the great volume of vapor which has to be handled or pumped and compressed and the necessity of compressing such vapor to a very limited extent in order to avoid an undue expense of power and also the necessity of transferring the heat of the vapor to the fluid under a very small difference of temperature it requires a very great heat-transferring surface between the condensing vapor and the fluid. These facts combined make such an apparatus expensive to construct and maintain on account of the great dimensions or size of apparatus required for economically evaporating a small amount of fluid. The leading objection to this form of evaporating lies in the fact of having to compress the vapor, which has so great a volume compared with that of the fluid which it contains. Therefore, in order to avoid the use of pumps or the work of compressing this vapor, I have made this invention.

In order to fully set forth my invention, reference will be had to the accompanying drawings, in which—

Figure 2:
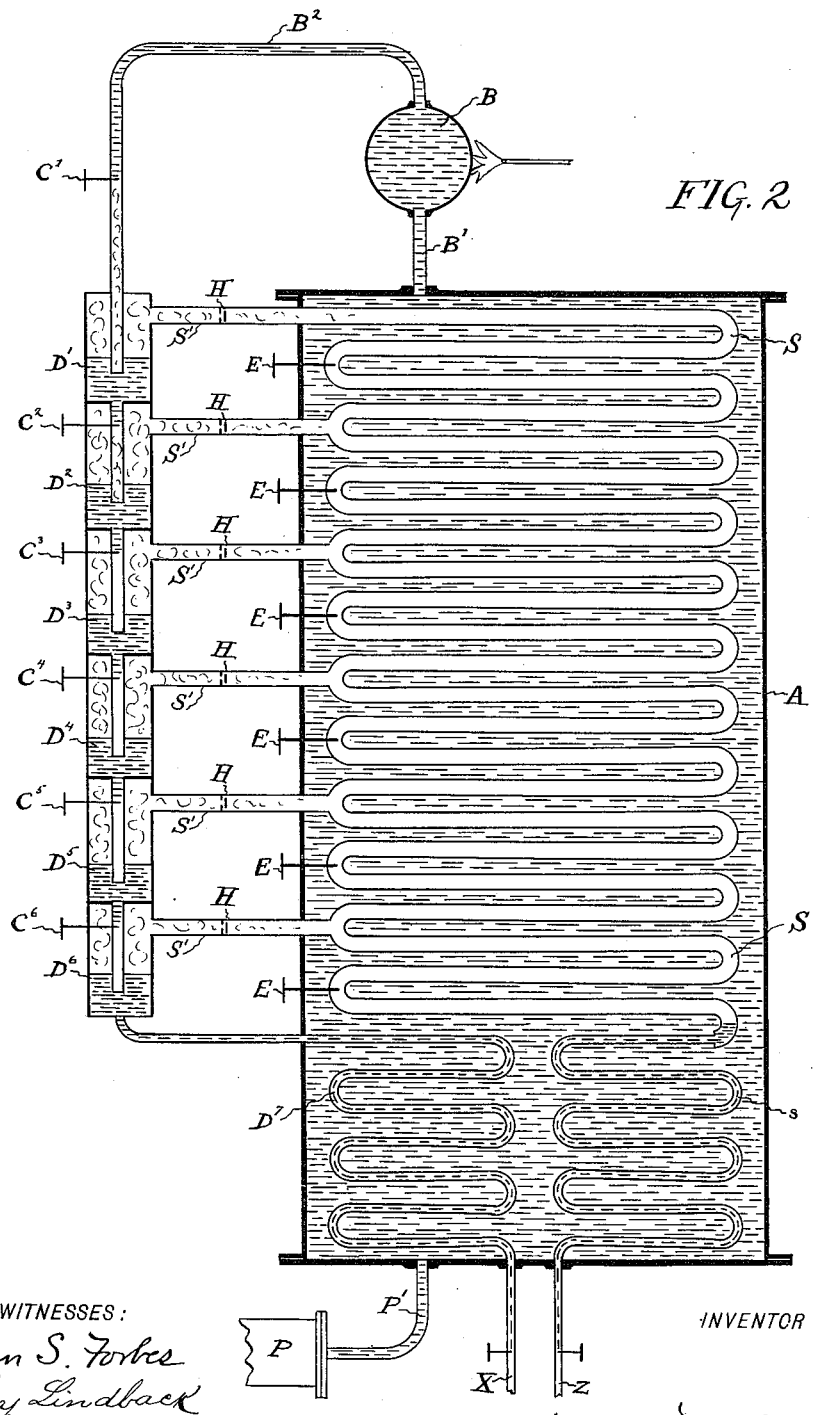
Figure 3:
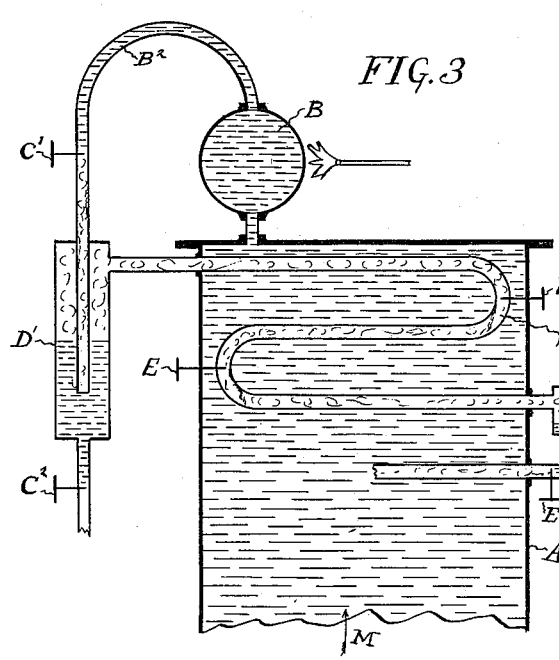
Figure 4:
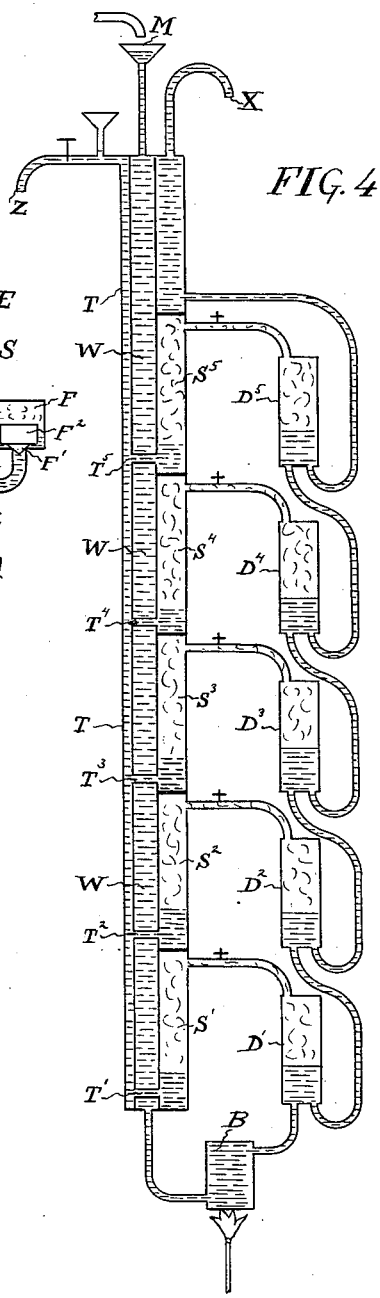

Figure 1 shows diagrammatically an apparatus designed for carrying out my invention. Fig. 2 shows diagrammatically a modified form of apparatus. Fig. 3 shows a detail. Fig. 4 is a modified form of apparatus.

Fig. 1 shows diagrammatically an apparatus having a series of heat-transferrers $A'$ $A^2$ $A^3$, &c. These heat-transferrers are composed of two water-tight compartments S and W, separated by tubes or partitions through which the heat may pass, while the water or steam is prevented from doing so. These transferrers are piped together, as shown, so that if water enters at pipe M it passes into transferrer $A'$, then out at the top of $A'$ into the bottom of $A^2$, then out of the top of $A^2$ into the bottom of $A^3$, and so on through $A^3$, $A^4$, and $A^5$ until it passes out at the top of $A^5$ into the boiler B, where additional heat is applied to it, as represented by a gas-flame. This water from the time it enters at M until it reaches the boiler B is under pressure. This pressure is produced by a pump P or from a supply at a sufficient height above the apparatus to cause sufficient pressure for preventing it from being transformed into steam when the proper amount of heat is applied to it at boiler B, which may be at as high a temperature as the water under pressure in the boiler will stand without forming steam. At this temperature the water passes down from boiler B through a pipe B' until it reaches valve C'. This valve may represent any form of reducing-valve which by the friction it offers or by any other means will reduce the pressure of the water which passes through it, so that the water after it has passed through this valve will have less pressure than it had before it passed through it. So this heated water after it has passed through valve C' has its pressure reduced, and the heat in this water therefore causes part of it to explode into steam, and this steam and water pass up from valve C' into the separator D'. These separators, of which several are shown, D', $D^2$, $D^3$, and $D^4$, are vessels into which the water is allowed to flow, through, or in and out, at their lower extremities and are adapted for entrapping the steam which is generated from such water, so that the steam will rise at the top and can be carried off or separated from the water from which it has arisen. This separation can be produced by gravitation, which enables the steam to be drawn off at the top of these separators D, while the water enters and is drawn out at the bottom. In order to prevent any possibiity of the water passing out at the top with the steam, a float-valve, represented by F, may be used, as shown in separator D'. This valve F represents any form of valve or device adapted for permitting the passage of steam and preventing the passage of fluid beyond a certain point; or in place of a valve the column of water in D' can be high enough to prevent it from rising up and passing out of the top of D' with the steam. With this explanation we will go back to valve C', through which the heated water passes and has its pressure reduced, which causes part of this water to explode or form into steam. The rest of the water passes down through valve $C^2$, where its pressure is again reduced, so as it passes up into separator $D^2$ more of this water explodes into steam, and this operation is repeated by passing into valve $C^3$, then into separator $E^3$, then into valve $C^4$ into separator $D^4$, so that by the time it leaves separator $D^4$ the steam has carried off the heat from this water until no more steam will rise from it. In this condition the water passes into compartment S of the heat-transferrer A' and then out through the bottom of this compartment through pipe X. In passing through transferrer A' the hot outflowing water has its heat transferred to the cold inflowing water by having the heat transferred through the partitions or metal which separates these two compartments S and W. In the heat-transferrer A' the water which has not been converted into steam passes out through the discharge X at about the same temperature as that of the water which enters M, so that little heat is lost or carried away by the water which leaves at X. Now we will go back and account for the water produced from the steam. As the hot water passes through valve C' and has its pressure reduced when it enters the separator D' part of this water explodes into steam and collects in the top of D' and passes through the valve R into the compartment S of the heat-transferrer $A^5$. This steam, coming into contact with the cooler water which is passing through compartment W of transferrer $A^5$, condenses, and the condensed water passes out from compartment S of transferrer $A^5$ through pipe T into compartment S of transferrer $A^4$. Then the water which passes through valve $C^2$ into the collector $D^2$ under a pressure again reduced gives up more steam, which passes through its valve R into compartment S of transferrer $A^4$. This steam is condensed by giving up its heat to the water passing through compartment W of transferrer $A^4$ and joins the condensed water which flows from transferrer $A^5$, and so the water of each transferrer passes into the succeeding one and the steam which is generated in each collector passes into compartment S of its heat-transferrer until the last steam which is generated in collector $D^4$ is condensed in compartment S of transferrer $A^2$, where its condensed water joins that which was condensed in all the other transferrers and passes out through pipe Z, or this hot condensed water may be conducted through passages which are in thermal contact with the water which flows through heat-transferrer A', so that all its heat will be given up or transferred to the cold inflowing water which enters pipe M, and in this way both the condensed water which passes out of pipe Z and the surplus water which passes out of pipe X will pass out cold, as they have both given up their heat to the cold inflowing water which enters pipe M, so that by this method, provided that the whole apparatus is insulated, there is no heat lost, except that due to the slight difference in temperature between the outflowing and inflowing water and the small amount of heat which will be lost through the insulation to the outer air. In operating this form of apparatus all the water enters at pipe M, part of it passes away as distilled water through pipe Z, and the rest of it, which has been heated and then cooled off, but not evaporated, passes out of pipe X. This carries the dregs and impurities left by the evaporated or distilled water. It is necessary that more water must enter at pipe M than is taken out as distilled water at pipe Z, for the reason that every pound of distilled water being condensed from steam makes it necessary that the latent heat from its steam be conducted off, and as the latent heat from one pound of steam is in excess of that amount of heat which one pound of water can absorb while being raised to the temperature of the steam therefore it is necessary that a greater amount of water must pass in at M and have its temperature raised by absorbing the latent heat of the condensing steam than can be realized as a condensate in the form of distilled water. Therefore the surplus water which is not drawn off in the form of distilled water in pipe Z is carried off after giving up its heat through pipe X, as stated. In operation this apparatus is as follows: We will assume that the work of evaporating water is to be carried on at a low pressure or a pressure below that of the atmosphere, so that the heat required in order to run the apparatus can be supplied from the exhaust-steam of an engine, and we will assume that Z' is an air-pump adapted for drawing off the air and the distilled water from pipe Z; also, that X' is an air-pump adapted for drawing off the air and water from pipe X. We will assume that both of these air-pumps will maintain a vacuum down to two pounds pressure absolute per square inch. Under these conditions water is allowed to enter pipe M and pass through each of the compartments W of the heat-transferrer A' A², &c., until it reaches the boiler B, where additional heat is applied to it. When the water reaches B, it will be under a pressure of thirteen pounds absolute. Under this pressure heat is applied to it by means of exhaust-steam passing through suitable pipes, which will bring this exhaust-steam into thermal contact with the water in B, or the steam may be exhausted into B. The temperature of this exhaust-steam is from 213° Fahrenheit or above. The temperature to which the water in B is to be raised should not be above 205°. This will be as much heat as this water can retain without forming steam. At this temperature I allow this water to pass from boiler B into collector D' at a pressure which is reduced from thirteen to ten pounds absolute. With this reduction of pressure part of the water will explode into steam, and this steam will pass into the heat-transferrer A⁵ and be condensed, as before described. This hot water, after part of it has escaped in the form of steam, will then pass from collector D' under a pressure of ten pounds into the collector D² under a pressure of seven pounds, when it will again give off steam, and so the operation will be repeated until the water passes into collector D⁴, or what steam there is remaining of it, at a pressure of two pounds absolute. Then the last of the steam will be given off, and the water will be drawn through to the transferrer A' at a starting temperature of about 126° and have its temperature reduced by transferring its heat to the inflowing water which is passing in A', as before described. Under these conditions great economy can be obtained, first, for the reason that the applied heat required is at such a low temperature that exhaust or waste steam can be employed for furnishing it, and, second, as the inflowing water has its heat supplied to a great extent by the heat given off by the condensed steam therefore very little heat is required to heat the apparatus. In fact, all the heat required is that needed for supplying what is lost by surface causes, which loss can be reduced to a minimum by proper insulation, and the amount of additional heat that is required for raising the temperature of the water after it has entered the boiler B is only that which is necessary to raise its temperature and that of the steam which it gives off sufficiently above the temperature already obtained by the inflowing water to allow the steam to transfer its heat through the partition or metal in the transferrers A' A², &c., to the water. In operating this apparatus through a greater range of temperature and pressure—say from fifty pounds indicated pressure to about ten pounds below atmosphere—a greater degree of economy can be obtained, for the reason that the higher the temperature the inflowing water is raised to under the required pressure the more heat it is capable of absorbing, and therefore the greater amount of steam it is capable of condensing. Consequently a greater proportion of the amount of water employed is distilled. Therefore less heat is required, as less water has to be heated in order to produce a given amount of distilled water. When this apparatus is operated entirely above atmospheric pressure, the air-pumps Z' and X' can be dispensed with, and both the distilled water and waste water can be allowed to flow from their respective pipes, and such flow can be regulated by suitable restraining-valves or stand-pipes. In such case the supply-water can be forced into the pipe M by means of a pump or by being supplied from a reservoir placed at a sufficient height above the apparatus to cause the required pressure.

I have shown a number of separate transferrers connected or piped in series for performing the work described by a step-by-step action; but it is obvious that continuous passages can be employed and placed within a single shell or transferrer, so that the resistance which the fluid and steam meet while passing through the apparatus will cause a gradual reduction of pressure on the water, which will allow or cause the gradual escape and condensation of steam instead of by the step-by-step method, as described.

Fig. 2 shows diagrammatically an evaporating apparatus embodying my invention, in which A represents the outer shell of a heat-transferrer, into which water is forced under pressure by the pump P through pipe P' into the bottom of A. This water fills A and passes up through pipe B' into the boiler B, where heat is applied to it. Then it passes out through pipe B² at about the same pressure that it had when entering from the pump P. Then it passes through the restraining or reducing valve C' into the separator D' at a slightly-reduced pressure. This causes part of the water to form into steam, as described in relation to Fig. 1. The water then passes at a reduced pressure successively through separators $D^2$ $D^3$, &c., when it passes out of $D^6$ through a heat-transferring pipe $D^7$, where its remaining heat is taken out by being absorbed by the cold water forced into the transferrer A from the pump P. By going back to $D'$ we find that a pipe S leads from this separator into the form of a coil, which is submerged in the water which fills the transferrer A. The separated steam from $D'$ escapes through this pipe and is condensed therein by giving up its heat to the water in A. This coil or pipe has connections $S'$, which lead to each of the separators $D'$ $D^2$, &c. Each of these separators gives up its steam to the coil S. The steam after entering the coil S is retained in pipe S until it is condensed and is prevented from entering any of its successive separators $s$ by means of check-valves H or by other devices known to the art. The steam that enters at the top of pipe S is condensed into water and flows down pipe S at a reduced or decreasing pressure, caused by the resistance it meets in passing through pipe S or by proper restraining or reducing valves, (represented by E,) so that by the time it reaches the connection $S'$, leading from separator $D^2$, its pressure is reduced, so that the steam from $D^2$ can also enter the pipe S and be condensed and join its condensed water to that previously formed, so that the steam in each successive separator can enter the pipe S and be condensed before it has reached the bottom of pipe S and joins the smaller pipe $s'$ in the form of distilled water. Then while this condensed steam or distilled water passes through pipe $s$ it gives up its heat to the water being forced in from pump P, so that it will come out near the temperature at which it entered. Therefore all the water which is forced in under pressure by pump P is raised in temperature by absorbing the latent heat of the steam and also the heat from the condensed water in pipe $s$ and the heat from the waste or uncondensed water in pipe $D^7$, so that the waters which are discharged at X and Z are reduced to nearly the same temperature as the water entering pipe P, while at the same time this water supplied from pump P under pressure is raised to a high temperature, so that by the time it has moved up through the transferrer A and passes into the boiler B but little more additional heat need be applied to it in order to give it all that it can retain without forming into steam to perform the work, as above described. It is evident that the nearer the water in A can be heated to the temperature required in boiler B by absorbing the heat from the steam less heat need be applied to the water in boiler B to raise it to the required temperature, and also it is evident that by reducing this water in pressure to a very slight extent steam can be generated from it at a higher temperature than the steam would have if its pressure were reduced to a greater proportion. Therefore by reducing the pressure gradually and drawing off the steam at a higher temperature and pressure the water in A is raised to a higher temperature and the amount of heat necessarily applied to boiler B is proportionately reduced, so that by reducing the pressure of the steam and condensed water gradually in the pipe S a greater degree of economy is attained in working the apparatus.

Fig. 3 shows a detail of apparatus, diagrammatically representing means for gradually reducing the pressure in pipe S and retaining the steam in the different sections of pipe S until it is condensed. This is done by any form of reducing-valves, as follows: $C'$ represents a valve which will deliver the heated water from boiler B at a slightly-reduced pressure to the separator $D'$. E E represents reducing or restraining valves which gradually reduce the pressure of the steam and condensed water passing through them, either by means of a mechanical resistance or by offering an active resistance the same as that offered in the form of friction to a fluid while passing through pipes, which causes it to be discharged at a pressure or speed below that due to the pressure under which it enters. F shows a steam-trap connected to a part of the passage formed by pipe S, which prevents the passage of steam by means of the valve $F'$, but permits the passage of condensed water, as this water accumulates and rises high enough to act upon the float $F^2$ and raise the valve $A'$. I show these valves for the purpose of explaining how certain functions can be performed; but in practice this work can be performed by taking advantage of the active resistance offered by the pipes and the difference in the specific gravity between steam and water. As a means for separating them I have shown that both the condensed and waste water can be cooled off by the exchange of heat to the inflowing water, or the waste water alone can be cooled off and the distilled water can be drawn off hot when required in that condition and used hot for the purpose of supplying boilers or other uses.

Fig. 4 shows diagrammatically a form of apparatus in which the pressure under which the inflowing water is placed, and also the varying pressures and densities which occur in all parts of the apparatus, are produced by gravitation. In this form the water is supplied at M or from a constantly-maintained pressure or level. As the water passes down through the heat-transferrer W its pressure is increased as it reaches a lower level until it reaches its greatest pressure at B, whereas much additional heat is applied to it as it can contain without forming steam. As this water rises to the separator $D'$ its pressure is decreased, and therefore some of it forms into steam and passes into the top of section $S'$ of the steam-condenser, where it comes into thermal contact with the water in W and is condensed. The water, after passing through $D'$, enters $D^2$, where its pressure is again decreased, and more steam is liberated and condensed into $S^2$, and so on to the top, where the heat of the waste water is transferred to the cold water entering at M. All the water that is condensed in $S'$ $S^2$, &c., is passed by the short pipes $T'$ $T^2$, &c., to the stand-pipe T, from where it is discharged at Z. It is plain that by this form gravitation is employed to produce the gradual pressures required in all parts of the apparatus in order to maintain the proper working balance.

What I claim as my invention is—

1. The method of evaporating fluids, consisting in passing the fluid while under pressure through a series of heat-transferrers to a point within the apparatus where as much additional heat is applied to such fluid as it can contain without forming steam or vapor, then allowing the heated fluid to pass through a series of valves or passages by which the pressure under which the fluid is held is gradually reduced, thereby causing steam or vapor to repeatedly escape from said fluid as its pressure is reduced, then transferring the heat from the steam or vapor to the inflowing fluid, thereby causing the steam or vapor to condense into fluid; substantially as described.

2. The method of evaporating water or fluids, by transferring the heat or steam to the water to be evaporated while such water is under pressure, then by applying additional heat to the water under pressure after it has been raised in temperature by absorbing heat from the steam, then by gradually relieving the heated water from its pressure, allowing part of it to form into steam, and then by transferring the heat from such steam to the water under pressure while on its way to where heat is applied to it, causing the steam to be condensed into water substantially as described.

3. The method of evaporating fluids by supplying the fluid with nearly as much heat as it can retain without forming into steam; then by gradually relieving such fluid from its initial pressure, causing part of it to form into vapor, then transferring the heat of such vapor to the fluid before it has been raised to its highest temperature; thereby condensing such vapor into fluid; then transferring the heat of the fluid not formed into vapor to all of the fluid while on its way to where additional heat is applied to it; then drawing off the condensed or distilled fluid from a separate pipe from which the unevaporated fluid passes; substantially as described.

4. In the art of distilling, the method of conducting water under pressure to where heat is applied to it, then by releasing it from its pressure, causing part of it to form into steam, and then condensing the steam by transferring its heat to the water while under pressure; substantially as described.

ADDISON G. WATERHOUSE.

Witnesses:
 JNO. S. FORBES,
 KAY LINDBACK.